(12) United States Patent
Lee et al.

(10) Patent No.: US 6,688,751 B2
(45) Date of Patent: Feb. 10, 2004

(54) POLARIZATION SPLITTING BACKLIGHT MODULE

(75) Inventors: Chih-Kung Lee, Taipei (TW); Jiun-Yan Wu, Taipei (TW); Shu-Sheng Lee, Taipei (TW); Ching-Heng Tang, Taipei (TW)

(73) Assignee: Slight Opto-Electronics Co., Ltd., Taipei (TW)

( * ) Notice: Subject to any disclaimer, the term of this patent is extended or adjusted under 35 U.S.C. 154(b) by 0 days.

(21) Appl. No.: 09/908,061

(22) Filed: Jul. 18, 2001

(65) Prior Publication Data

US 2002/0176165 A1 Nov. 28, 2002

(30) Foreign Application Priority Data

Jul. 26, 2000 (TW) ....................................... 89114911 A (51) Int. Cl.[7] ................................................. F21V 9/14
(52) U.S. Cl. ............................ 362/19; 362/26; 362/31; 349/65
(58) Field of Search ............................. 362/19, 26, 31, 362/330; 359/483, 487; 349/63, 64, 65

(56) References Cited

U.S. PATENT DOCUMENTS 5,962,114 A    10/1999  Jonza et al.  ................ 428/212
6,044,196 A  *  3/2000  Winston et al.  ............. 349/159
6,305,811 B1 * 10/2001  Beeson et al.  ................ 349/65

* cited by examiner

Primary Examiner—Sandra O'Shea
Assistant Examiner—Guiyoung Lee
(74) Attorney, Agent, or Firm—J.C. Patents (57) ABSTRACT

A polarization splitting backlight module for efficiently converting a non-polarized light beam emitted from the light source into a single polarization state is disclosed. The polarization splitting backlight module of the present invention comprises an under plate with a ridged lower surface, a light source, a special reflection film, a scattering structure, a substrate and a polarization splitting film. The light beam emitted from the light source is introduced into the scattering structure between the under plate and the substrate. After a series of processes, such as scattering, reflection, phase retardation and polarization beam-splitting, the light beam will pass through the polarization splitting film being of a single polarization state such that it could be utilized by electro-optical systems, such as liquid crystal displays. The present invention converts light beams into a single polarization state, and the efficiency thus is higher than that of a conventional backlight module. The present invention achieves brightness levels that are almost twice that of conventional backlight module.

19 Claims, 12 Drawing Sheets

POLARIZATION SPLITTING BACKLIGHT MODULE

BACKGROUND OF THE INVENTION

1. Field of the Invention

The present invention relates generally to backlight modules, and more particularly to a polarization splitter backlight module for converting a non-polarized light beam into a single polarization state.

2. Description of the Related Art

With the advent of the information technology (IT) age, there is an increasing demand for high-quality electro-optical displays (LCDs). Higher quality imaging requires the more efficient utilization of light sources. Conventionally, for obtaining single-polarized light beam output form a LCD backlight plate, a polarization plate is arranged near the light source to inhibit the passage of certain polarized light beams, whereby the polarized light beams which are not parallel are prevented form being transmitted. In practice, the resultant light beams of a single polarization state are less than half of those of the original light source in terms of illuminance.

Figure 1:
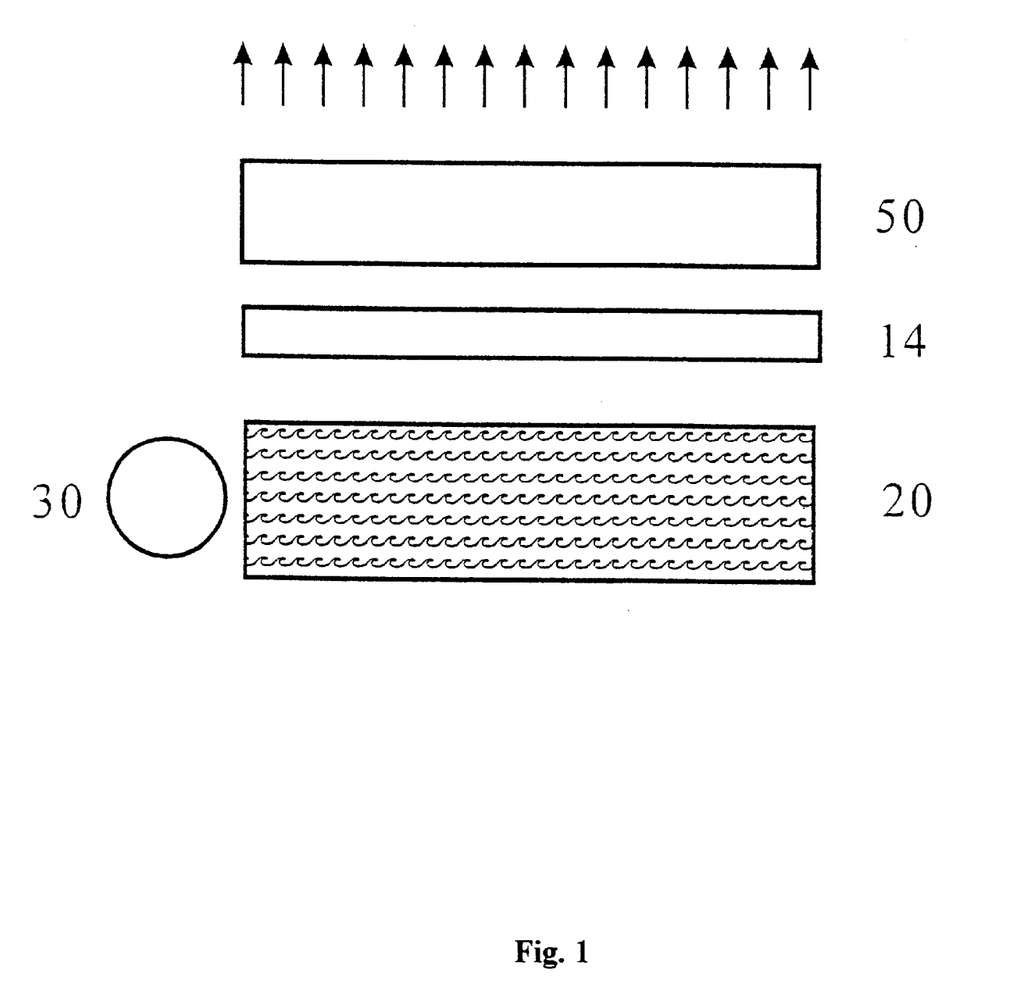
FIG. 1 is a schematic drawing showing a conventional backlight module used in a liquid crystal display.

With reference to FIG. 1, a conventional liquid crystal display comprises a non-polarized light source 30, a diffusion plate module 20, a polarization plate 14 and a liquid crystal component 50. Light beams emitted from the non-polarized light source 30 are introduced into the diffusion plate module 20, and are polarized by the polarization plate 14 so as to be utilized by the liquid crystal component 50. The intensity of the resultant light beams will be reduced over 50% and will be less than half of the intensity of the original light beam due to the screening effect through the polarization plate 14. Since the optical energy loss between the resultant and original light beams is considerable, the power consumption of a system using such a construction is very significant, thereby limiting the quality of the image display.

SUMMARY OF THE INVENTION

In view of the above problems, the object of the present invention is to provide a polarization splitting backlight module for generating a light source of a single polarization state, which reduces the optical loss in light beam output, is suitable for mass production, and decreases manufacturing costs.

Another object of the present invention is to provide a polarization splitting backlight module, which is easily integrated with conventional light guides and achieves high-quality polarization splitting.

To achieve the above objects, the polarization splitting backlight module according to the present invention for generating a light source of a single polarization state comprises:

an under plate having an upper surface and a ridged lower surface;

a phase retardation reflection film of high reflectivity, provided on the lower surface of the under plate;

a substrate having a lower surface, substantially complementary to the upper surface of the under plate, and an upper surface;

a scattering structure provided between the substrate and the under plate for altering the polarization state and the travelling direction of the light beam; and a polarization splitting film provided on the upper surface of the substrate, which allows the light beams of different polarization states to be transmitted or reflected.

In order to enhance the optical performance, the ridge pitch of ridged surface of the under plate may be constant or not so as to increase the design freedom. Moreover, in order to increase the efficiency for altering the polarization states, the phase retardation reflection film is utilized. In addition, four lateral sides of the polarization splitting backlight module may be optionally coated with a reflection film, so as to increase the transmission efficiency of the light beams.

Furthermore, the polarization splitting backlight module according to the present invention can be easily integrated with a conventional liquid crystal display backlight module. This is achieved by attaching the polarization splitting film and the upper surface of the under plate according to the present invention to the upper side and lower side of the diffusion plate of the conventional backlight module respectively.

Additional advantages, objects and features of the present invention will become more apparent from the description which follows.

BRIEF DESCRIPTION OF THE DRAWING

The present invention will become more apparent from the detailed description given hereinbelow when read in conjunction with the accompanying drawings, which are given by means of illustration only and thus are not limitative of the present invention, in which.

DETAIL DESCRIPTION OF THE PREFERRED EMBODIMENT

Figure 2:
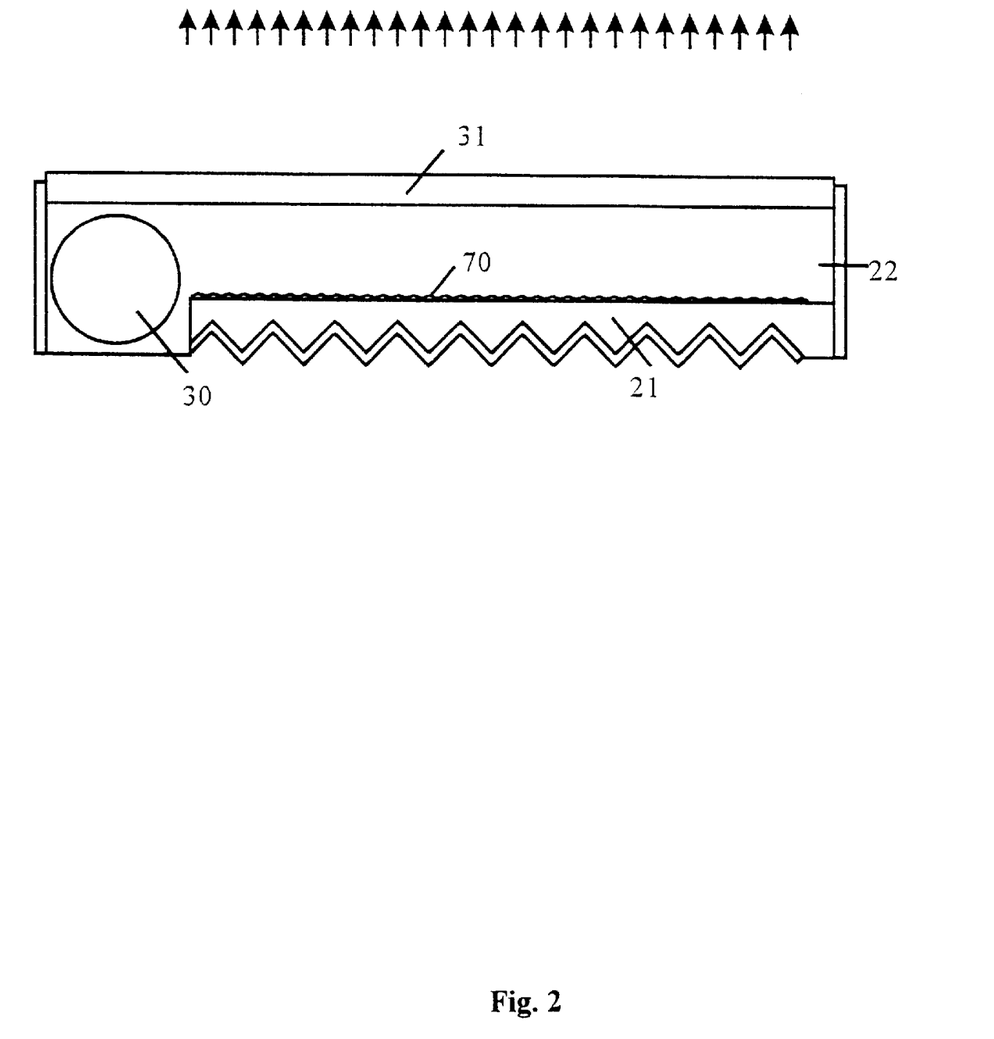
FIG. 2 is a schematic drawing showing a polarization splitting backlight module according to the present invention.

FIG. 2 illustrates the preferred embodiment of the polarization splitting backlight module according to the present invention. The polarization splitting backlight module is a laminated construction composed of an under plate 21, a light source 30, a substrate 22 and a polarization splitting film 31. A scattering structure 70 is provided between the under plate 21 and the substrate 22. The under plate 21 has a ridged lower surface and a phase retardation reflection film (not shown) coated thereon. The phase retardation reflection film functions to convert the light beams incident thereto in terms of polarization and then reflect the converted light beams. The scattering structure 70 also functions to convert the light beams in terms of polarization. Therefore, the efficiency of the light beams passing through the polarization splitting film 31 can be increased. In this embodiment, the ridge angle between any two neighboring ridges on the lower surface of the under plate 21 is 90 degrees.

Figure 3:
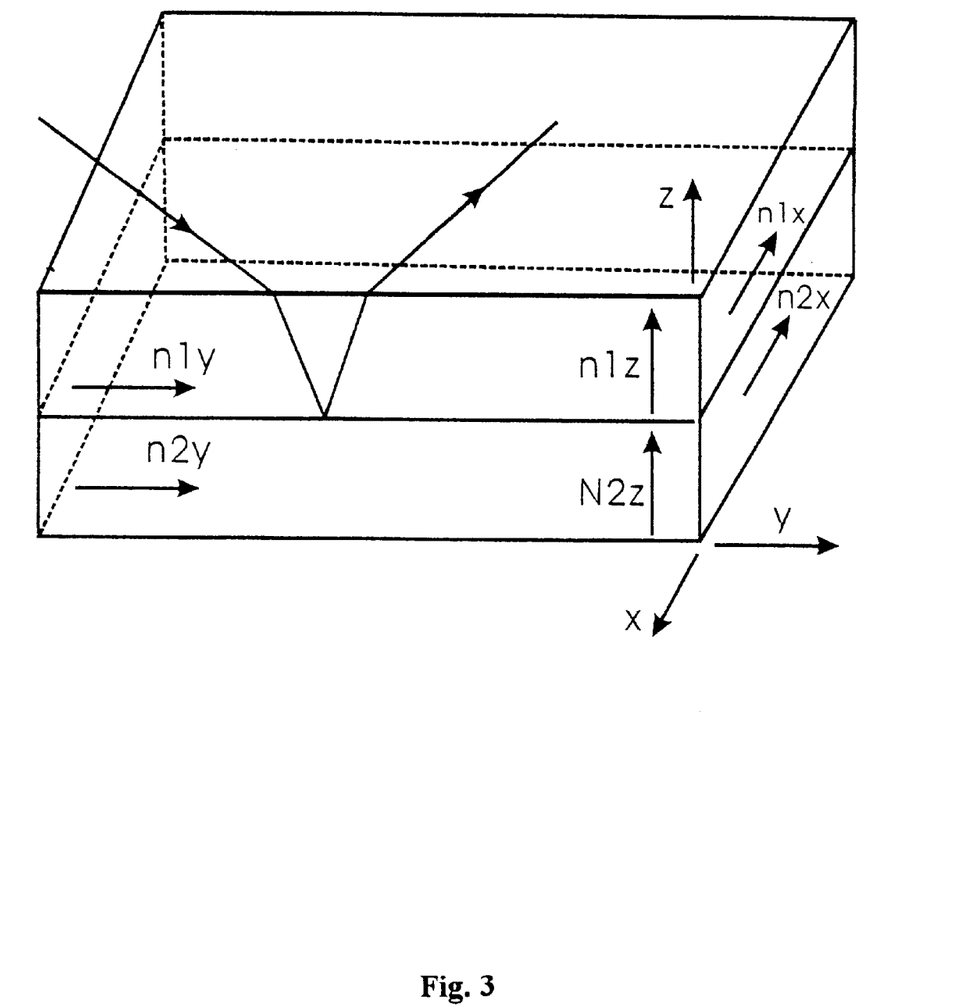
FIG. 3 is a schematic drawing showing a two-layer stake of films forming a single interface according to U.S. Pat. No. 5,962,114.

The polarization splitting film 31 is a film that permits light beams of specific polarization state to be transmitted through and others to be reflected. For example, the multilayer film disclosed in U.S. Pat. No. 5,962,114, which is incorporated herein for reference, can be utilized as a polarization splitting film according to the present invention. FIG. 3 shows a two-layer stake of films forming a single interface according to U.S. Pat. No. 5,962,114, in which two films are laminated along the z-direction. The refractivity of the films along the x-, y- and z-direction are (n1x,n1y,n1z) (n2x,n2y,n2z) respectively. According to the teaching from U.S. Pat. No. 5,962,114, if (n1y-n2y) and (n1z-n2z) are of the same sign, the polarized light beam along the x-direction will be transmitted through the films and the polarized light beam along the y-direction will be reflected. Therefore, light beams of different polarization states can be splitted.

Figure 4:
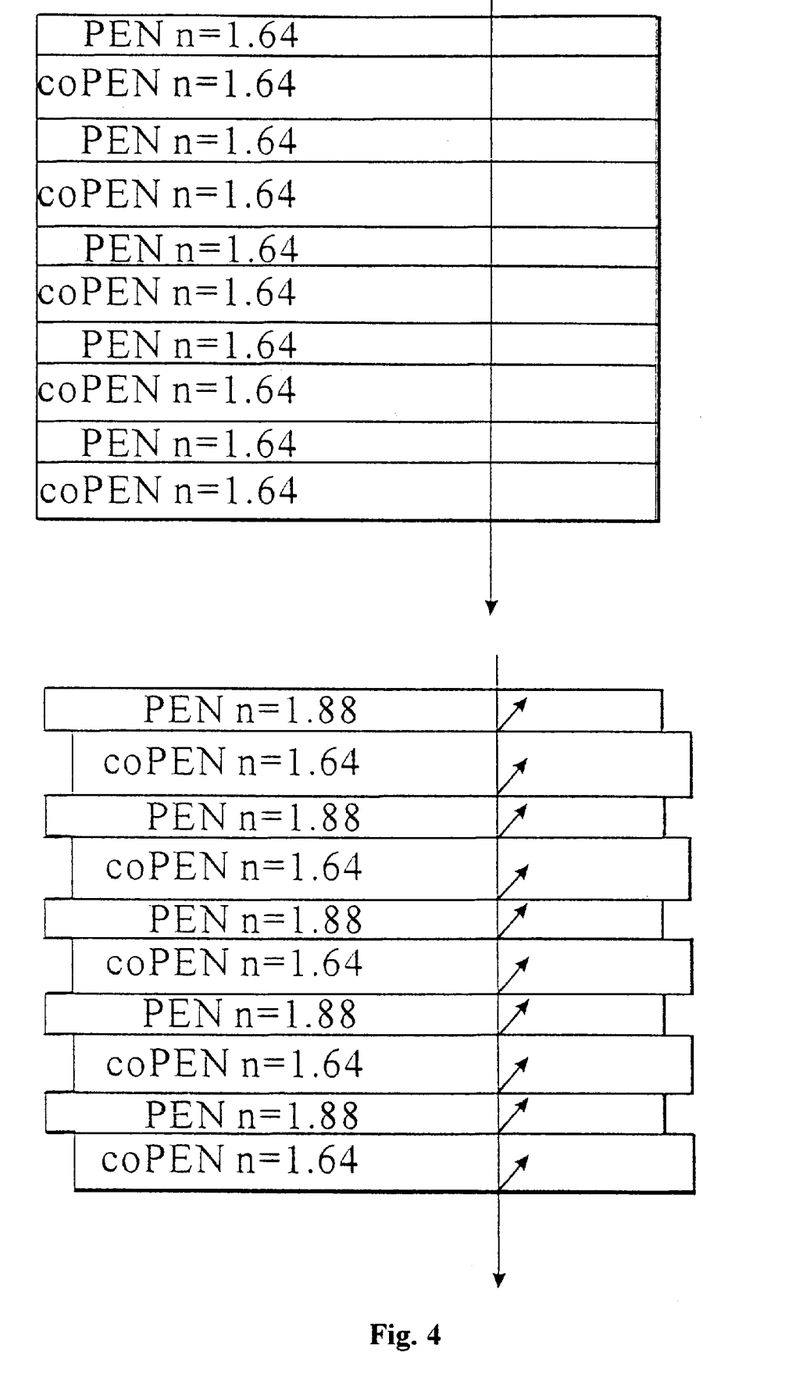
FIG. 4 is a schematic drawing, showing the reflection and transmission effect regarding light beams of two different polarization states according to U.S. Pat. No. 5,962,114.

FIG. 4 shows the reflection and transmission effect regarding light beams of two different polarization states according to the multilayer film of U.S. Pat. No. 5,962,114, which can be utilized in the present invention. The multilayer film shown in FIG. 4 is composed of PEN (2,6-polyethylene naphthalate) and coPEN (copolymer derived from ethyleneglycol, naphthalene dicarboxylic acid and some other acids such as terephthalate) and allows polarized light beams in specific direction to be transmitted and others in the direction perpendicular to the specific direction to be reflected.

It should be noted that the direction of the polarized light beams passing through the polarization splitting film 31 should not be parallel to that of the ridges on the lower surface of the under plate 21. The phase retardation reflection film may be either applied or coated through evaporation, onto the ridged surface of the under plate 21. In this embodiment, the ridge angle of the ridges of the under plate 21 is 90 degree, so that continuous reflection or total reflection of the light beams can be achieved at the lower surface of the under plate 21.

As another embodiment, the substrate 22 can be replaced with a diffusion plate of conventional backlight module, and the polarization splitting film 31 can be adhered to the diffusion plate so as to achieve the polarization converting of the light beam.

Figure 5:
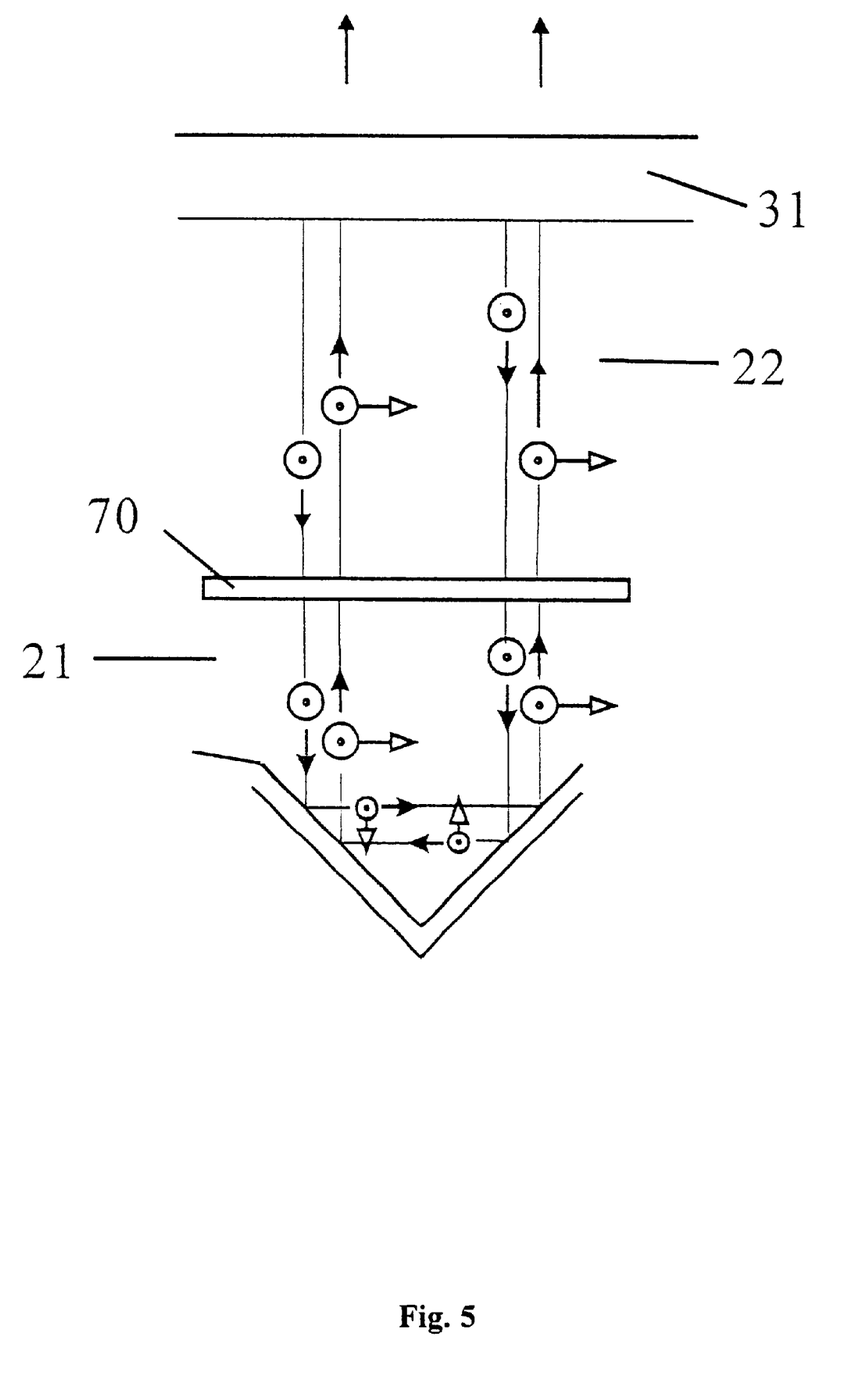
FIG. 5 is a schematic drawing showing the optical path in the polarization splitting backlight module according to the present invention.

With referenced to FIG. 5, an optical path, regarding a light beam entered from one side of the substrate being distributed in the polarization splitting backlight module uniformly by means of scattering structure 70, between the under plate and the polarization splitting film is shown. In FIG. 5, the solid arrow designates the S-polarized component, and the hollow arrow designates the P-polarized component. It should be noted that the P-polarized component means the component which may pass through the polarization splitting film (not shown), whereas the S-polarized component is perpendicular to the P-polarized component and will be reflected back by the polarization splitting film. In this case, an incident non-polarized light beam travels upward to the polarization splitting film 31, with the P-polarized component directly passing through the polarization splitting film 31. On the other hand, the S-polarized component is continuously reflected at the ridged surface of the under plate and converted thereafter by the phase retardation reflection film to possess P- and S-polarized components partially. Similarly, the P-polarized component will pass through the polarization splitting film 31, whereas the S-component will be reflected and converted again. Through a series of the above-mentioned procedures, the incident non-polarized light beam is output as a single P-polarized light beam. It is noted that in FIG. 5, the ridge pitch of the lower ridged surfaces of the under plate is constant.

Figure 6:
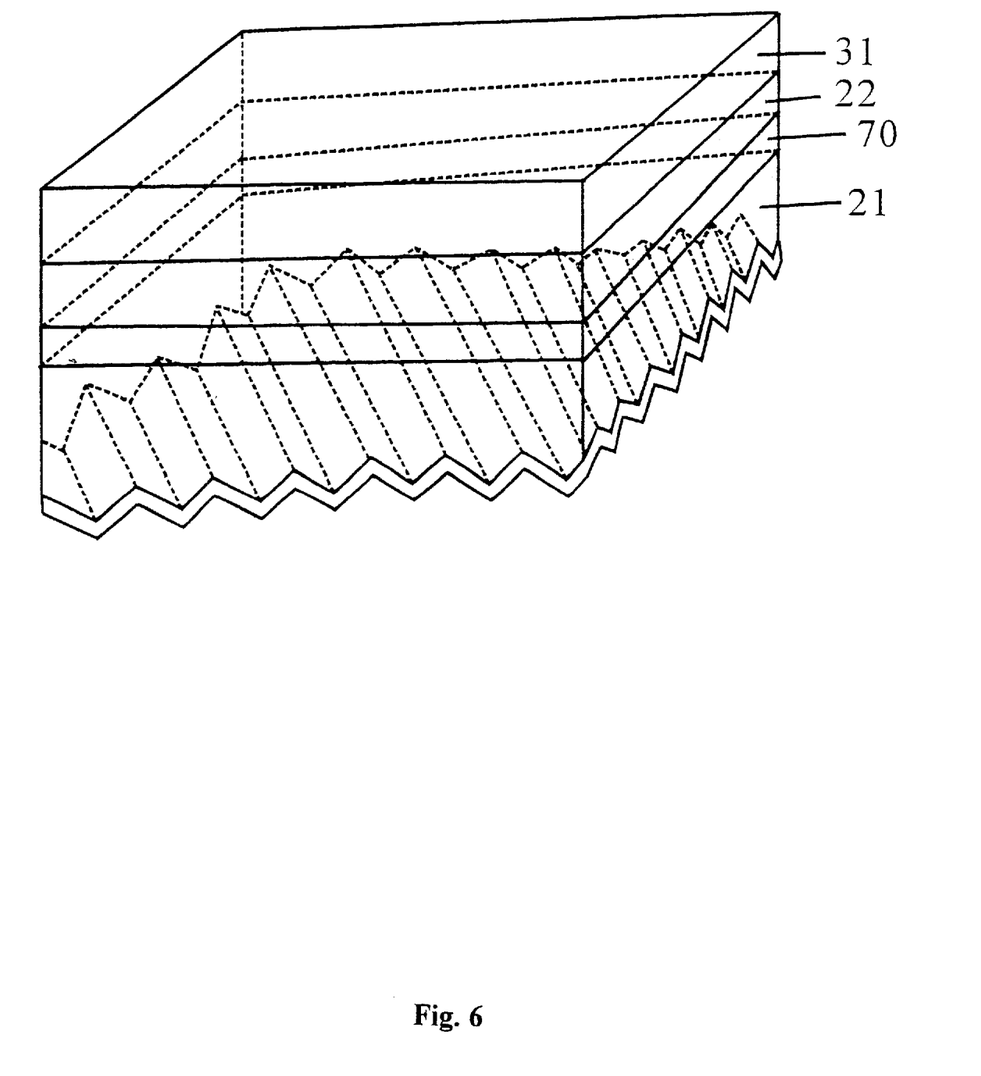
FIG. 6 is a perspective view of the polarization splitting backlight module according to the present invention.

FIG. 6 is a perspective view of the polarization splitting backlight module according to another embodiment of the present invention. It is shown that the ridge pitch of the ridged lower surface of the under plate is not constant, and the polarization direction of the polarization splitting film 31 is not parallel to the ridge lines, thereby increasing the freedom of designing.

The ridge pitch of the ridged lower surface of the under plate may not be constant. However, the relative surface of the neighboring component, such as the substrate, should be substantially complementary to the ridged surface of the under plate, so that any additional film can be attached therebetween and especially avoid the occurance of morie effect.

Figure 7:
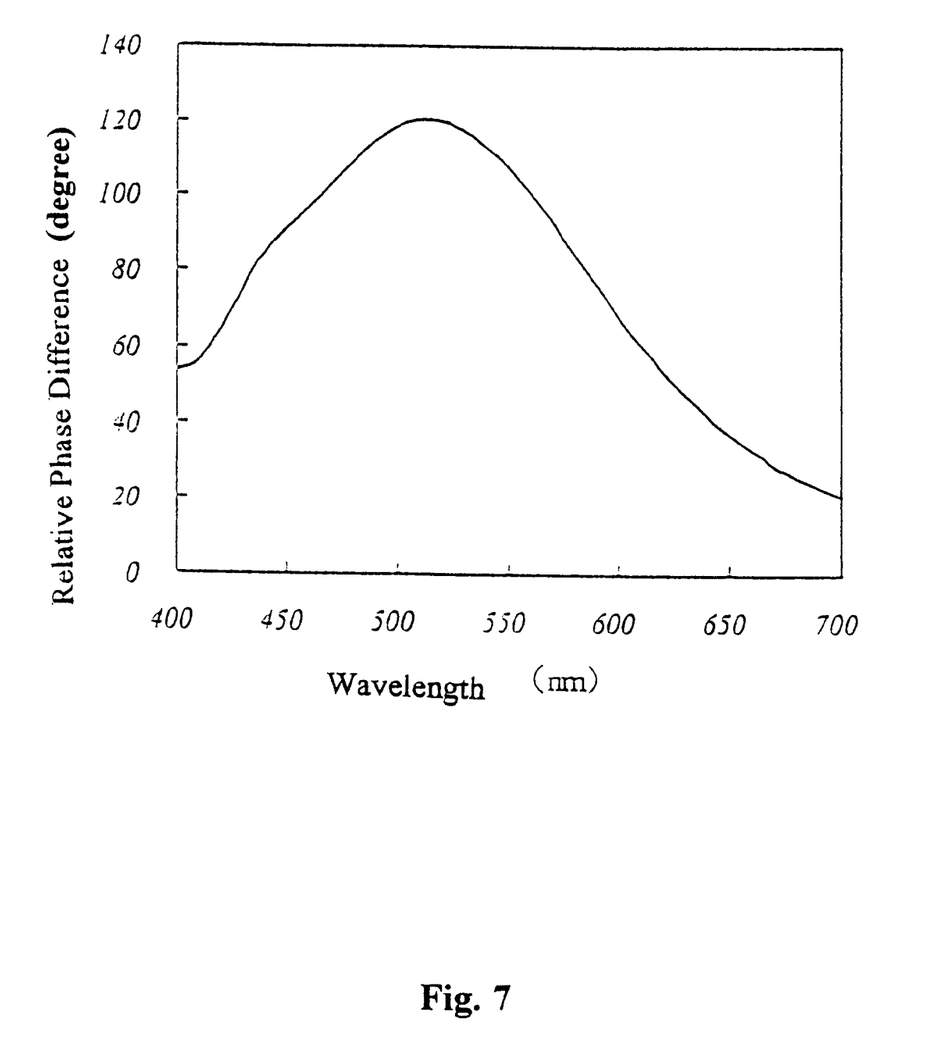
FIG. 7 shows the relative phase difference of P-S polarized components over different wavelengths of light beams incident to a typical phase retardation reflection film of high reflectivity.
Figure 8:
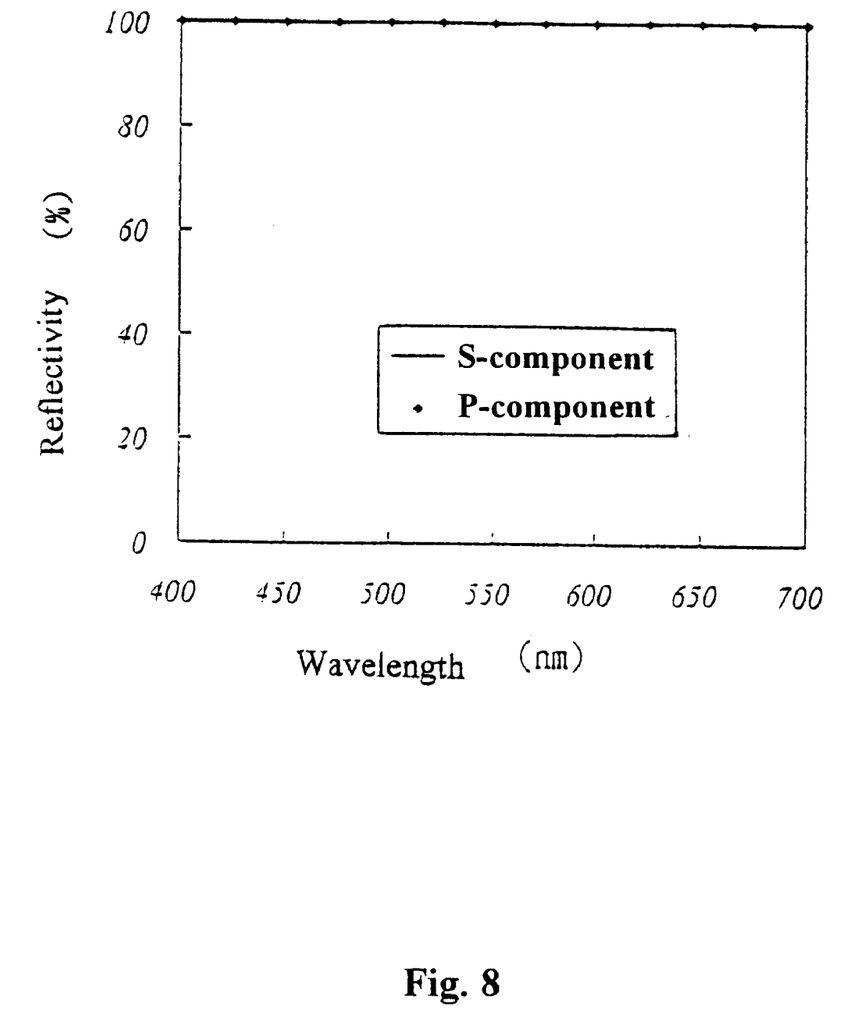
FIG. 8 shows the reflectivity of P-S polarized components over different wavelengths of light beams incident to a typical phase retardation reflection film of high reflectivity.

The substrate 22 may be made of any suitable optical material, for example, plastic material such as PMMA, PC or ARTOM™ or any other glass material, depending on the specific process therefor. In designing a suitable optical coating thereof, it is fundamental to determine the refractivity of the substrate in advance. Table 1 shows the refractivity over different wavelengths for ARTON™ at different absorption rate and temperature. With referenced to FIG. 7 and FIG. 8, the relative phase difference and reflectivity of P-S polarized components over different wavelengths of light beams incident to a typical phase retardation reflection film of high reflectivity are shown respectively.

A phase retardation reflection film of high reflectivity coated on the ridged lower surface of the under plate 21 may convert the light beam incident thereto in terms of polarization and reflect it back to interior of the substrate 22. For example, if the wave length of the incident light beam is 400 to 700 nm, the ridge angle of the ridged lower surface of the under plate 21 is 90 degree, and the refractivity of the substrate 22 made of PMMA is 1.532, this coated film may be composed of MgF2, ZnS, CeF3, MgF2, ZnS, CeF3 and MgF2, and the thickness thereof may be respectively 110.82, 20.13, 84.88, 141.93, 111.47, 84.88 and 25.38 nm. If the above conditions remain the same except for a substrate made of Norbornene (ARTON™), the coated film may be composed of MgF2, ZnS, CeF3, MgF2, ZnS, CeF3 and MgF2, and the thickness thereof may be 110.14, 26.54, 84.88, 139.92, 117.22, 84.88 and 117.71 nm respectively.

Figure 9:
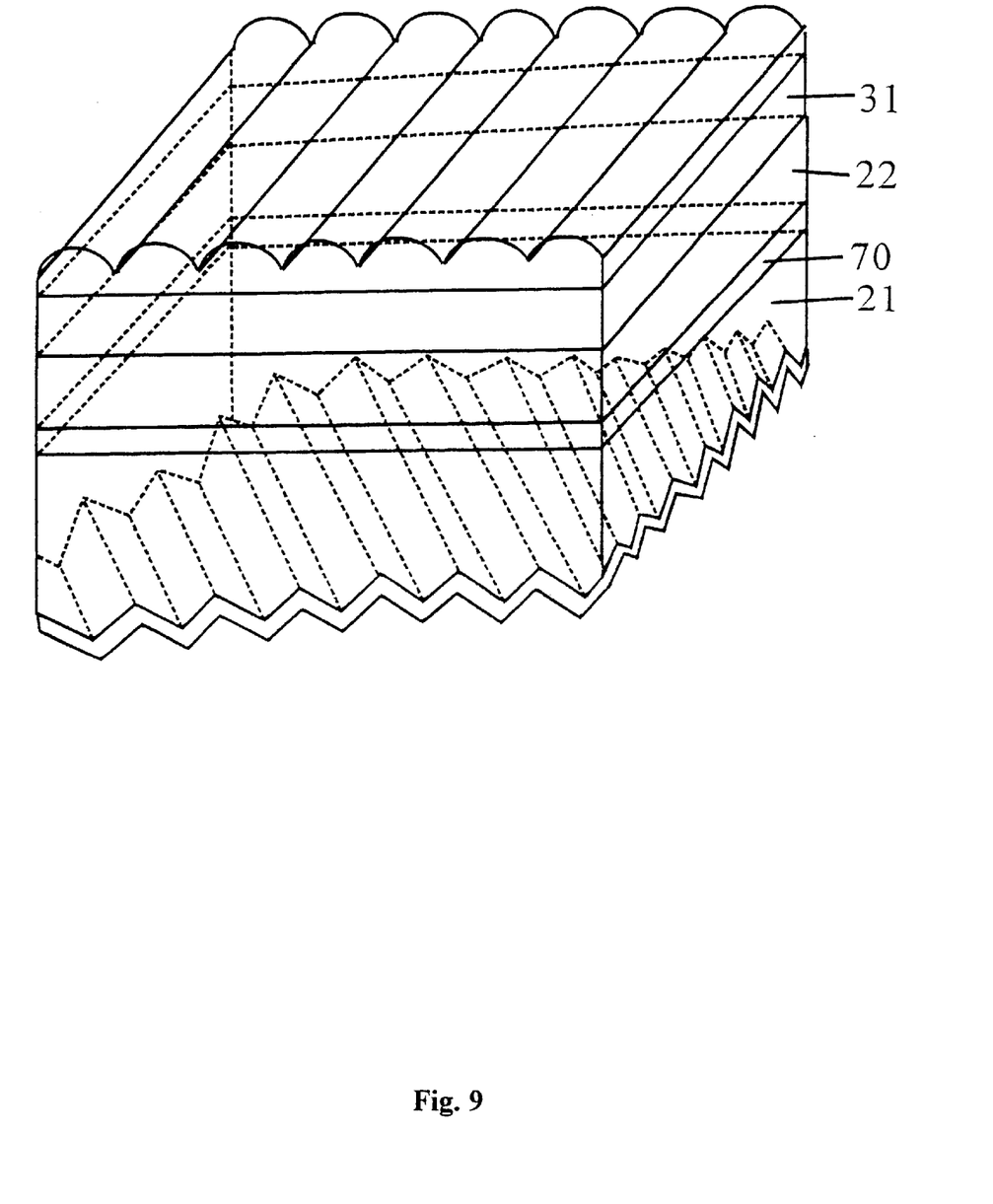
FIG. 9 is a perspective view of another embodiment of the polarization splitting backlight module according to the present invention, in which a film having a upper surface with cylindrical undulations is attached to the upper surface of the polarization splitting film.
Figure 10:
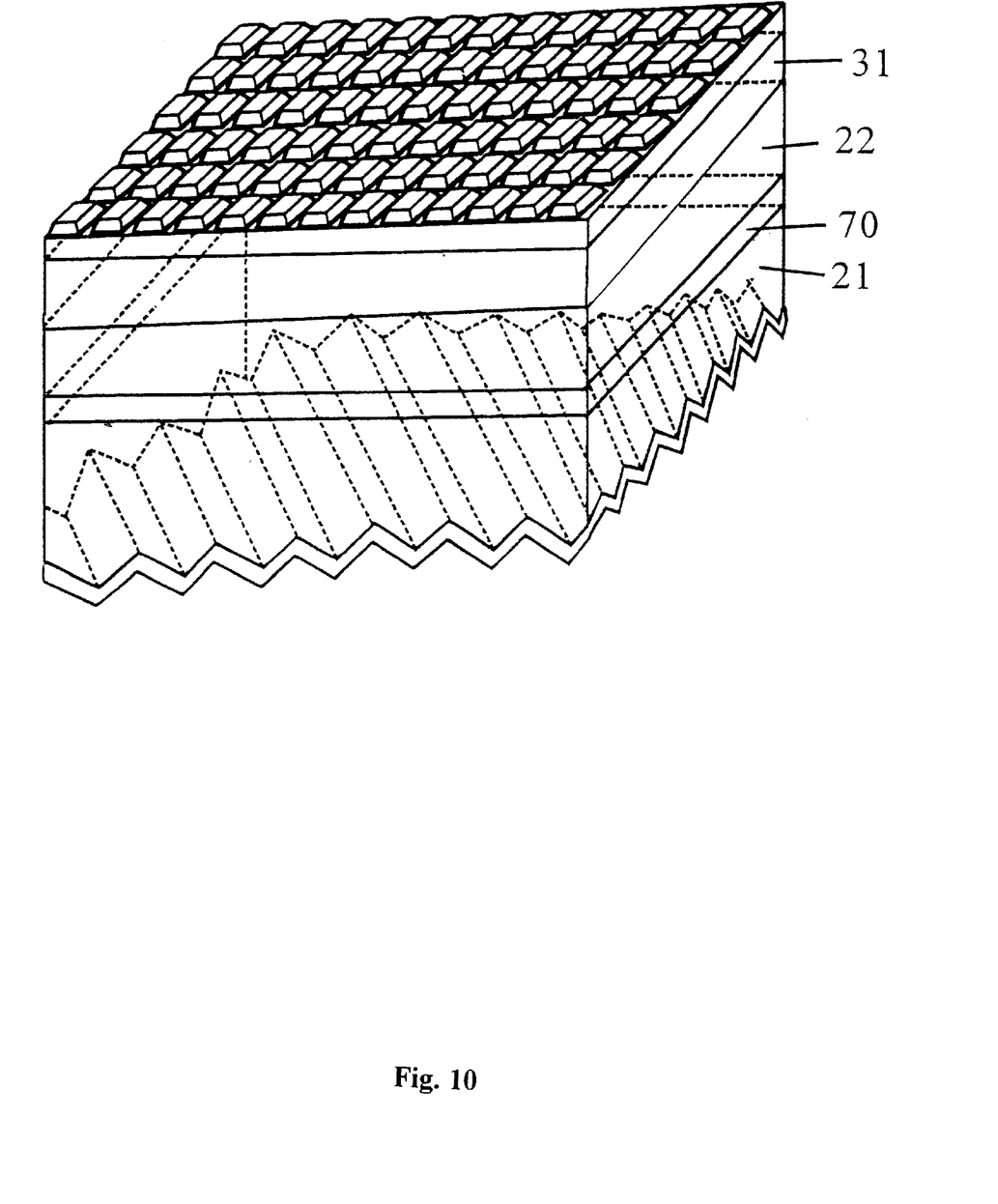
FIG. 10 is a perspective view of still another embodiment of the polarization splitting backlight module according to the present invention, in which a film having an upper surface with square protuberances is attached to the upper surface of the polarization splitting film.

In addition, films having surfaces of any suitable profiles can be attached to the upper surface of the polarization splitting film 31 such that the light beam can be outputted in parallel or at any other suitable angle. FIG. 9 shows that a film having a upper surface with cylindrical undulations is attached to the upper surface of the polarization splitting film. FIG. 10 shows a film having an upper surface with square protuberances is attached to the upper surface of the polarization splitting film. In this way, the output angle as well as the diffusion angle of the polarized light beams may be controlled and determined, and thus the output illuminance over different angles of view may be predetermined.

Four lateral sides of the substrate 22 may be applied with a reflection coating (not shown) to confine the light beams inside the substrate, so as to reduce the optical energy loss and further increase the optical performance of such a system. Table 2 shows several typical composition and thickness as to the reflection layer coated thereon through evaporation.

Figure 11:
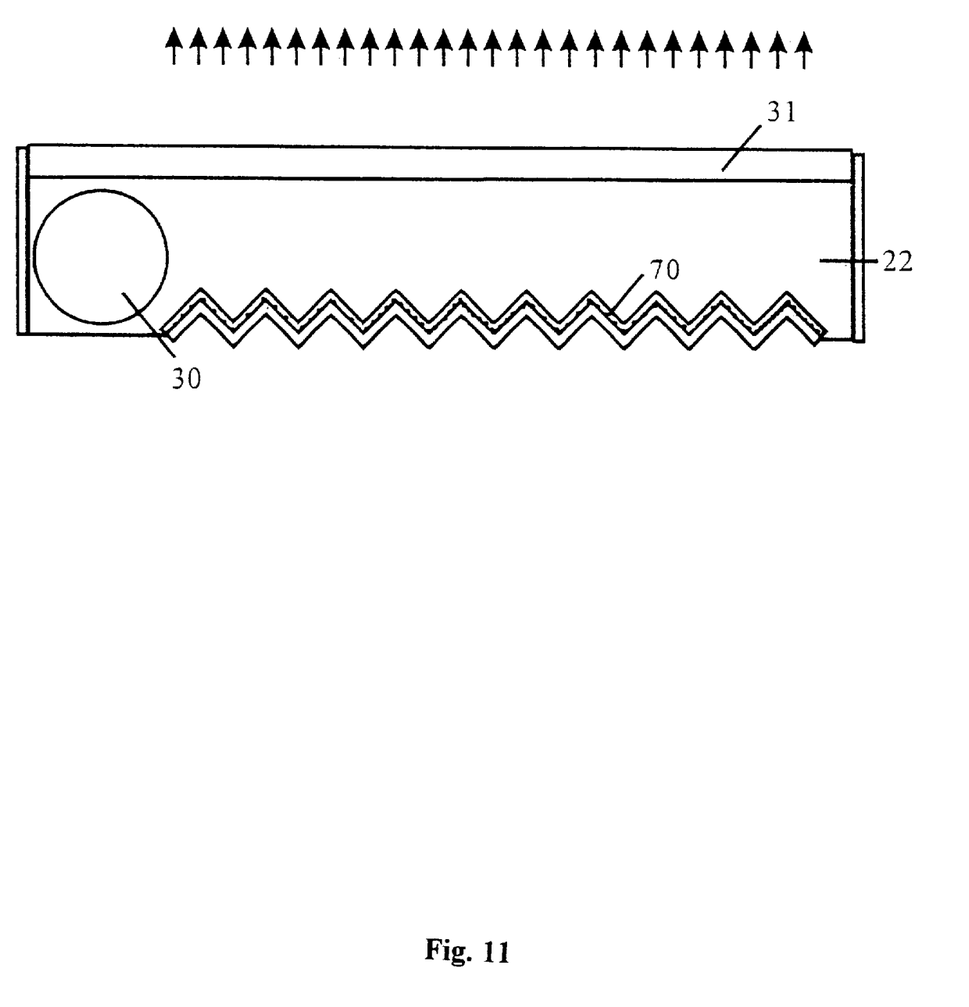
FIG. 11 is a sectional view of the backlight module according to another embodiment of the present invention, wherein the upper surface of the under plate is provided with a scattering structure.

With referenced to FIG. 11, another embodiment of the present invention is shown. In this embodiment, the polarization splitting backlight module can be constructed by removing the under plate, making the lower surface of the substrate 22 to be a ridged surface, attaching the lower surface of the substrate directly to the scattering structure, coating a phase retardation reflection film on the lower surface of the scattering structure, introducing the light beams from the lateral sides of the substrate and coating reflection film on the four lateral sides of the polarization splitting backlight module.

Figure 12:
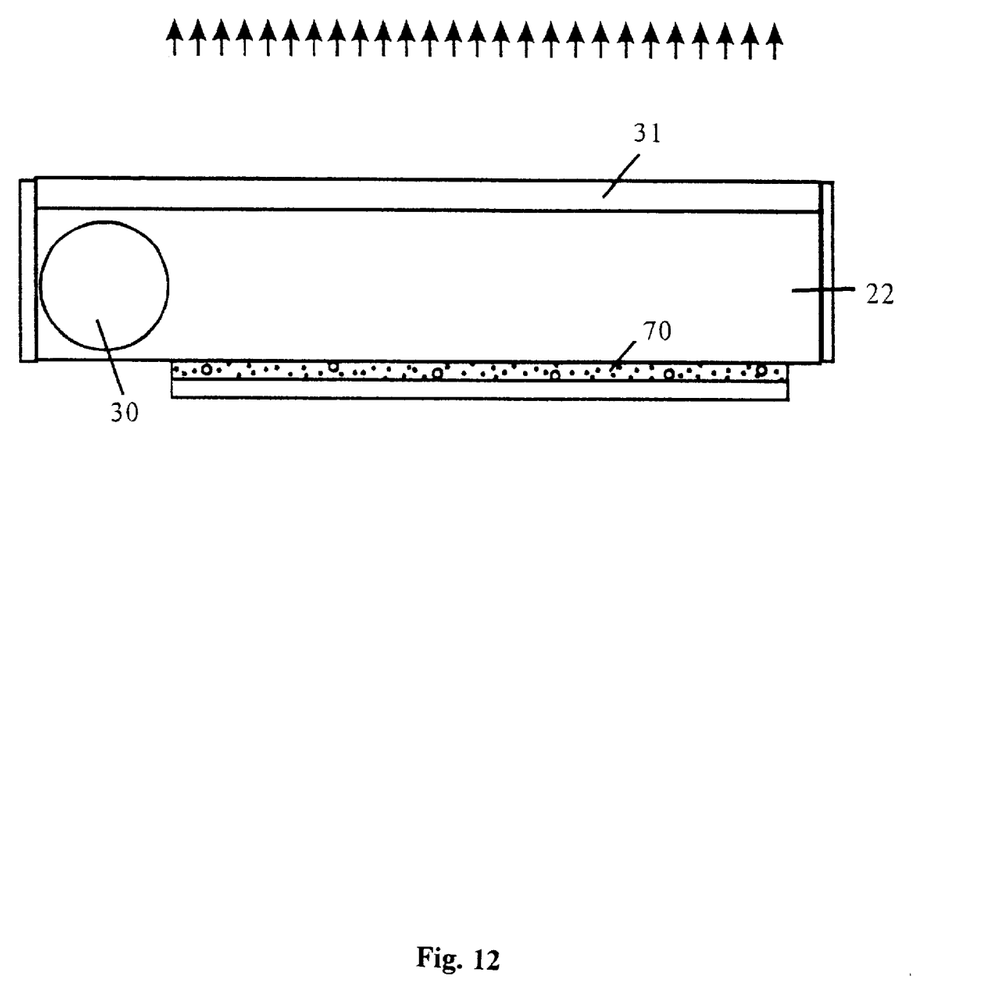
FIG. 12 is a sectional view of the backlight module according to another embodiment of the present invention, wherein the under plate is removed and the lower surface of the substrate is provided with a scattering structure and a phase retardation reflection film.

Alternately, the light can be distributed uniformly inside the polarization splitting backlight module by means of scattering structure 70 only, rather than the ridged configuration. With referenced to FIG. 12, the polarization splitting backlight module shown can be constructed by removing the under plate and coating a phase retardation reflection film onto the scattering structure 70.

Although the preferred embodiment of the present invention have been disclosed for illustrative purposes, those skilled in the art will appreciate that various modification, additions and substitutions are possible, without departing from the scope and spirit of the present invention as recited in the accompanying claims.

TABLE 2

Composition and Thickness of Typical Reflection Layer Coating (Unit: nanometer)

| ZnS | 38.59 | MgF$_2$ | 66.30 | Zns | 41.01 | MgF$_2$ | 70.47 | Zns | 43.59 |
|---|---|---|---|---|---|---|---|---|---|
| MgF$_2$ | 74.89 | ZnS | 46.33 | MgF$_2$ | 79.60 | ZnS | 49.24 | MgF$_2$ | 84.60 |
| ZnS | 52.33 | MgF$_2$ | 89.91 | ZnS | 55.62 | MgF$_2$ | 95.56 | ZnS | 59.11 |
| MgF$_2$ | 101.56 | ZnS | 62.83 | MgF$_2$ | 107.93 | ZnS | 66.77 | MgF$_2$ | 114.73 |
| ZnS | 70.96 | MgF$_2$ | 121.92 | ZnS | 75.41 | MgF$_2$ | 129.58 | Zns | 80.15 |
| MgF$_2$ | 137.72 | ZnS | 85.18 | MgF$_2$ | 146.38 | ZnS | 90.54 | MgF$_2$ | 155.56 |
| ZnS | 96.23 | MgF$_2$ | 165.34 | ZnS | 102.27 | MgF$_2$ | 175.72 | ZnS | 108.70 |

TABLE 1

ARTON FX26
Main Chain: NORBORNENE
Branch Chain: polyester function group

| | Measured wavelength | | | | |
|---|---|---|---|---|---|
| | 794.76 nm | 656 nm | 588 nm | 486 nm | 436 nm |
| Absorption rate (%) | | | | | |
| 0.01 | 1.5161 | 1.5198 | 1.5227 | 1.5298 | 1.5354 |
| 0.25 | 1.5163 | 1.5200 | 1.5230 | 1.5300 | 1.5357 |
| temperature (° C.) | | | | | |
| 30 | 1.515 | 1.519 | 1.521 | 1.528 | 1.534 |
| 40 | 1.514 | 1.518 | 1.520 | 1.527 | 1.533 |

What is claimed is:

1. A polarization splitting backlight module for generating a light source of single polarization state, comprising;

a under plate having an upper surface and a ridged surface;

a phase retardation reflection film of high reflectivity, provided on the lower surface of the under plate;

a substrate having a lower surface, substantially complementary to the upper surface of the under plate, and an upper surface;

a polarization splitting film provided on the upper surface of the substrate, which allows the light beams of different polarization states to be transmitted or reflected;

a scattering structure provided between the substrate and the upper surface of the under plate for altering the polarization state and the travelling direction of the light beam in a such manner that a reflected light from the polarization splitting film is projected towards the scattering structure which is again reflected by said scattering structure towards said polarization splitting film so that the reflected light is partially polarized and transmitted through said polarization splitting film, and the remaining light is reflected by said polarized splitting film projecting towards said scattering structure which is reflected back towards said polarization splitting film, and the phenomena of partial polarization, transmission and reflection continues; and a light source located at the lateral side of the substrate and the under plate.

2. The polarization splitting backlight module of claim 1, wherein the direction of the polarized light beams passing through the polarization splitting film is not parallel to the ridges on the lower surface of the under plate.

3. The polarization splitting backlight module of claim 1, wherein the ridge angle of the lower surface of the under plate is in a range from 45 degrees to 135 degrees.

4. The polarization splitting backlight module of claim 1, wherein the ridge pitch of the lower surface of the under plate is constant.

5. The polarization splitting backlight module of claim 1, wherein the ridge pitch of the lower surface of the under plate is not constant.

6. The polarization splitting backlight module of claim 1, wherein the polarization splitting film is a 408-layer multi-layer film composed of PEN and coPEN.

7. The polarization splitting backlight module of claim 1, wherein the polarization splitting film is a 204-layer multi-layer film composed of PEN and coPEN.

8. The polarization splitting backlight module of claim 1, wherein the polarization splitting film is a 601-layer multi-layer film composed of PET and Ecdel.

9. The polarization splitting backlight module of claim 1, wherein the polarization splitting film is a 449-layer multi-layer film composed of PEN and coPEN.

10. The polarization splitting backlight module of claim 1, wherein the polarization splitting film is a 601-layer multi-layer film composed of PEN and coPEN.

11. The polarization splitting backlight module of claim 1, wherein the polarization splitting film is a 449-layer multilayer film composed of PET and coPEN.

12. The polarization splitting backlight module of claim 1, wherein the polarization splitting film is a 481-layer multilayer film composed of PEN and sPS.

13. The polarization splitting backlight module of claim 1, wherein the polarization splitting film is a 601-layer antireflection multilayer film composed of PEN and coPEN.

14. The polarization splitting backlight module of claim 1, wherein the phase retardation reflection film is a dry film formed through application of an optical-precision method.

15. The polarization splitting backlight module of claim 1, wherein the scattering structure is formed through painting.

16. The polarization splitting backlight module of claim 1, wherein the scattering structure is a configuration consisting of materials of different optical coefficients.

17. The polarization splitting backlight module of claim 1, wherein the scattering structure is formed through the roughness of the upper surface of the under plate.

18. The polarization splitting backlight module of claim 1, wherein the scattering structure is formed through the roughness of the lower surface of the substrate.

19. The polarization splitting backlight module of claim 1, wherein the substrate has the effect of scattering.

* * * * *